INVENTORS:—
AXEL CHARLES WICKMAN &
ALAN SALISBURY LAMBURN
BY
ATTORNEYS

Oct. 4, 1966     A. C. WICKMAN ETAL     3,276,552
MOTOR VEHICLE TRANSMISSION SYSTEM
Filed Sept. 27, 1963     9 Sheets-Sheet 6

FIG. 8.

INVENTORS:—
AXEL CHARLES WICKMAN &
ALAN SALISBURY LAMBURN
BY Hiscock, Downings
ATTORNEYS Oct. 4, 1966     A. C. WICKMAN ETAL     3,276,552

MOTOR VEHICLE TRANSMISSION SYSTEM

Filed Sept. 27, 1963

FIG.9.

INVENTORS:—
AXEL CHARLES WICKMAN &
ALAN SALISBURY LAMBURN

FIG. 10.

INVENTORS :—
AXEL CHARLES WICKMAN &
ALAN SALISBURY LAMBURN

FIG. 11.

United States Patent Office 3,276,552
Patented Oct. 4, 1966

3,276,552
MOTOR VEHICLE TRANSMISSION SYSTEM
Axel Charles Wickman, Sarasota, Fla., and Alan Salisbury Lamburn, Kencott, via Lechlade, England, assignors to Axel Wickman Transmissions Limited, Coventry, Warwickshire, England
Filed Sept. 27, 1963, Ser. No. 312,091
Claims priority, application Great Britain, Oct. 5, 1962, 37,708/62
11 Claims. (Cl. 192—.092)

The invention relates to a motor vehicle power transmission system of the kind including a disengageable coupling, and a change-speed gearing, of which latter the ratios are selectable by appropriately positioning a control, through which drive is communicable from the vehicle engine to a road wheel axle. With a motor vehicle provided with a transmission of this kind there is a liability for at least an inexperienced, or thoughtless driver to endeavour to start the vehicle from rest in too high a gear-ratio, for example, when, after stopping at a traffic signal with a high gear-ratio engaged, the attempt to move off is made without previously selecting a lower gear-ratio. As a result of such bad driving the engine can be stalled, or the disengageable coupling, if a friction clutch, is subjected to undue wear and, in consequence, its useful life is curtailed. It is the primary object of the invention to frustrate an attempt to drive forward from rest, a motor vehicle having a power transmission system of the kind set forth when an unduly high ratio of the change-speed gearing is engaged.

To this end, and according to the invention, a motor vehicle power transmission system, of the kind set forth, is arranged so that the change-speed gearing control is adapted to actuate means for preventing the transmission of adequate power from the engine to drive the road wheel axle when an attempt is made to drive the vehicle forward from rest other than in a lower gear-ratio of the change-speed gearing.

In the case of a change-speed gearing offering four or more forward ratios the change-speed gearing control and the said means could be associated so as, for example, to permit the vehicle to be driven from rest only when the lowest forward gear-ratio, the lowest intermediate gear-ratio or the reverse gear-ratio is engaged, while in the case where the said gearing only provides three forward ratios the change-speed gearing control and the said means could be associated so as to require the selection of the lowest forward gear-ratio or the reverse gear-ratio before the vehicle could be driven from rest.

Also according to the invention a motor vehicle power transmission system is arranged so that the change-speed gearing control, when in a position appropriate to the selection of at least one high gear-ratio, is adapted to actuate means for preventing the transmission of adequate power from the engine to drive the road wheel axle when an attempt is made to drive the vehicle forward from rest, or for the change-speed gearing control, only when in a position appropriate to the selection of an adequately low gear-ratio, to deactivate means for preventing the transmission of adequate power from the engine to drive the road wheel axle when an attempt is made to drive the vehicle forward from rest.

In the case where the vehicle engine operates with spark ignition the change-speed gearing control, when in a position appropriate to the selection of at least one high gear-ratio, may, according to a first aspect of the invention, be adapted to actuate means for interrupting the ignition circuit when the vehicle is at rest, means being provided for inhibiting such action when the vehicle is travelling forward at a road speed appropriate to the said selected high gear-ratio. Thus, according to this aspect of the invention the engine would be stopped if the driver were to attempt to start from rest with the high gear-ratio engaged, and he would therefore be obliged to select a lower gear-ratio and re-start the engine before he could move off.

The means for interrupting the ignition circuit in this way may, according to a further feature, include a normally-closed relay-operated switch in series with the ignition switch, the circuit of the relay winding being in series with a switch, which is arranged to be operated to a closed condition when the change-speed gearing control is in a position appropriate to the selection of the high gear-ratio, and with a switch which is arranged to be closed when the vehicle is stationary but is operated to an open condition by a road-speed-responsive means as soon as the vehicle moved from rest.

According to a second aspect of the invention, and in the case where the disengageable coupling is a friction clutch which is biased to the engaged position by a mechanical spring means and is disengageable by the actuation of a manually operable lever, the change-speed gearing control, when in a position appropriate to the selection of at least one high gear-ratio and the friction clutch is operated to the disengaged position, may be adapted to actuate means for preventing the clutch from engaging under the influence of the engaging bias when the said lever is unactuated, means being provided for inhibiting such action when the vehicle is travelling forward at a road speed appropriate to the said selected high gear-ratio. In such a case and according to yet another feature, the change-speed gearing control, when in the position appropriate for the selection of the high gear-ratio and when the vehicle is stationary, may cause an abutment to lie in a position to baulk the movement, by the spring means, of a part of the clutch disengaging mechanism to the position in which the clutch would engage.

In such a case, and according to another feature, the abutment may be moved, against a bias, into its baulking position by a solenoid in an electric circuit including a series-connected switch which is arranged to be operated to closed condition when the change-speed gearing control is in a position appropriate to the selection of the high gear-ratio, and a second series-connected switch which is arranged to be operated from closed, to open condition by road-speed-responsive means when the vehicle is moving.

According to a third aspect of the invention, and in the case where the disengageable coupling is a friction clutch which is biased to the engaged position by fluid pressure and is disengageable by a relief of the fluid pressure, the change-speed gearing control, when in a position appropriate to the selection of at least one high gear-ratio, may be adapted to actuate valve means for relieving the fluid pressure when the vehicle is at rest, means being provided for inhibiting such action when the vehicle is travelling forward at a road speed appropriate to the said selected high gear-ratio. In such a case and according to a further feature, the change-speed gearing control, when in the position appropriate for the selection of the high gear-ratio and when the vehicle is stationary, may be arranged to actuate means for closing a valve which would otherwise supply the hydraulic pressure necessary for engaging the clutch, and opens a relief valve of the hydraulic circuit. Preferably the valve is solenoid-operated, and the solenoid is in an electric circuit including a series-connected switch which is arranged to be operated to closed condition when the change-speed gearing control is in a position appropriate to the selection of the high gear-ratio, and a second series-connected switch which is arranged to be operated from closed, to open condition by road-speed-responsive means when the vehicle is moving.

Alternatively in the case where the disengageable coupling is a friction clutch which is biased to the engaged position by mechanical spring means and is disengageable by fluid pressure, the change-speed gearing control, when in a position appropriate to the selection of at least one high gear-ratio, may be adapted to actuate means for preventing the fluid pressure from being relieved when the vehicle is at rest, means being provided for inhibiting such action when the vehicle is travelling forward at a road speed appropriate to the said selected high gear-ratio. In such a case and according to yet another feature, the change-speed gearing control, when in the position appropriate for the selection of the high gear-ratio and when the vehicle is stationary, may be arranged to actuate means for preventing opening of a valve which would otherwise permit relief of the fluid pressure for allowing the bias to engage the clutch.

Preferably the relief valve is solenoid-operated, and the solenoid is in an electric circuit including a series-connected switch which is arranged to be operated to closed condition when the change-speed gearing control is in a position appropriate to the selection of the high gear-ratio, and a second series-connected switch which is arranged to be operated from closed, to open condition by road-speed-responsive means when the vehicle is moving.

According to a fourth aspect of the invention and in the case where the disengageable coupling is a friction clutch of a character automatically to disengage when the engine speed falls below a predetermined value, the change-speed gearing control, when in a position appropriate to the selection of at least one high-gear-ratio, may be adapted to actuate means for preventing movement of the clutch into the engaged position when the engine is accelerated to above the said predetermined value while the vehicle is at rest, means being provided for inhibiting such action when the vehicle is traveling forward at a road speed appropriate to the said selected high gear-ratio. In such a case and according to a further feature, the means for preventing re-engagement of the clutch may include a member which, whenever a high gear-ratio is engaged, is moved to a position in which it baulks movement of a centrifugally-acting portion of the clutch from the disengaged, to the engaged position, and which is moved to a non-baulking position when a low gear-ratio is engaged. Preferably the said centrifugally-acting portion of the clutch is provided with a surface which, when the said high gear-ratio is engaged and the clutch tends to disengage due to the rotational speed of the engine falling below a fixed value, acts on the member to displace it momentarily against a bias so as to permit the said portion to move into a position in which the clutch is disengaged, the bias then returning the member to its baulking position so that movement of the said portion for re-engaging the clutch will be baulked. Also the member is preferably operatively associated with the means for selecting those low ratio gears of the change-speed gearing in which it is required for the member to be in a non-baulking position, so that when the said low ratio gears are engaged the member will be moved to a non-baulking position, and that when the said low ratio gears are disengaged the member will be moved to a baulking position.

According to a fifth aspect of the invention and in the case where the disengageable coupling is of the kind in which the kinetic energy of a fluid is communicated from a driving to a driven element, the change-speed gearing control, when in a position appropriate to the selection of at least one high gear-ratio, may be adapted to actuate means for withdrawing the fluid from the coupling when the vehicle is at rest, means being provided for inhibiting such action when the vehicle is travelling forward at a road speed appropriate to the said selected high gear-ratio. In such a case and according to a further feature, the change-speed gearing control, when in the position appropriate for the selection of the high gear-ratio and when the vehicle is stationary, may be arranged to energise the winding of a solenoid-operated valve whereby to withdraw the hydraulic fluid from the coupling and to allow the hydraulic fluid to be replaced with air, the process being reversed when the change-speed gearing control is moved to select a lower gear-ratio. Preferably the change-speed gearing control, when in the position appropriate to the high gear-ratio, is arranged to close a switch in the circuit of the solenoid, and this switch is in series with a second switch which is operated from closed, to open condition by road-speed-responsive mean when the vehicle is moving.

The switch, for inhibiting the actions imposed when the change-speed gearing control is selecting the high gear-ratio when the vehicle is at rest, is preferably arranged to be operated to its inhibiting condition only when the vehicle has attained a predetermined forward speed. In this way any attempt to engage the high gear-ratio when the road speed is below the said predetermined value will also be frustrated.

The road-speed-responsive means is preferably a governor which is driven from a road wheel of the vehicle or from a part (e.g., a speedometer cable) which rotates in sympathy therewith.

The invention is described with reference to the accompanying drawings, in which.

Figure 1:
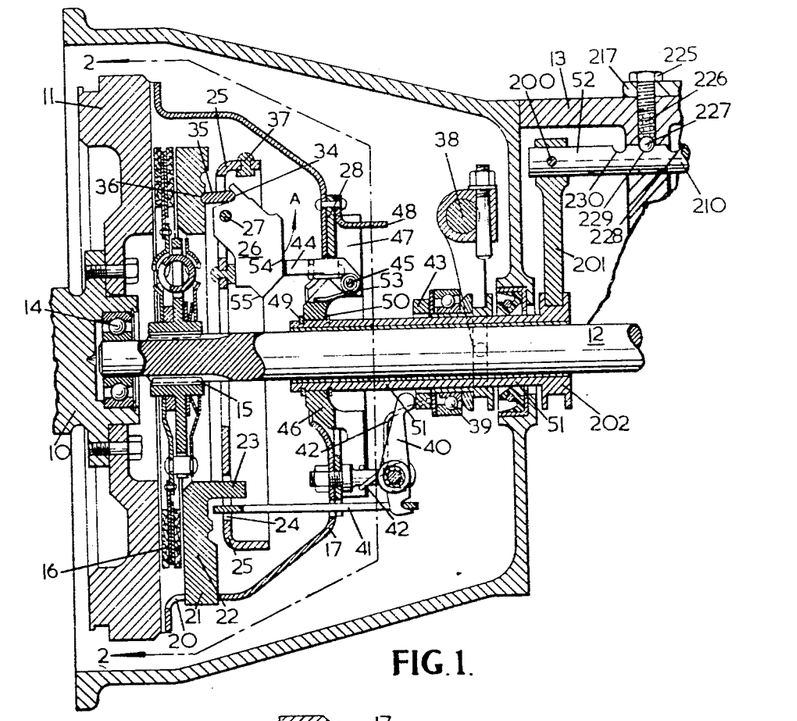
FIGURE 1, which illustrates an embodiment of the said fourth aspect of the invention, is a longitudinal vertical section through a centrifugal clutch and part of a change-speed gear-box taken on the line 1—1 of FIGURE 2, the clutch being shown in the disengaged position and prevented from re-engagement.
Figure 4:
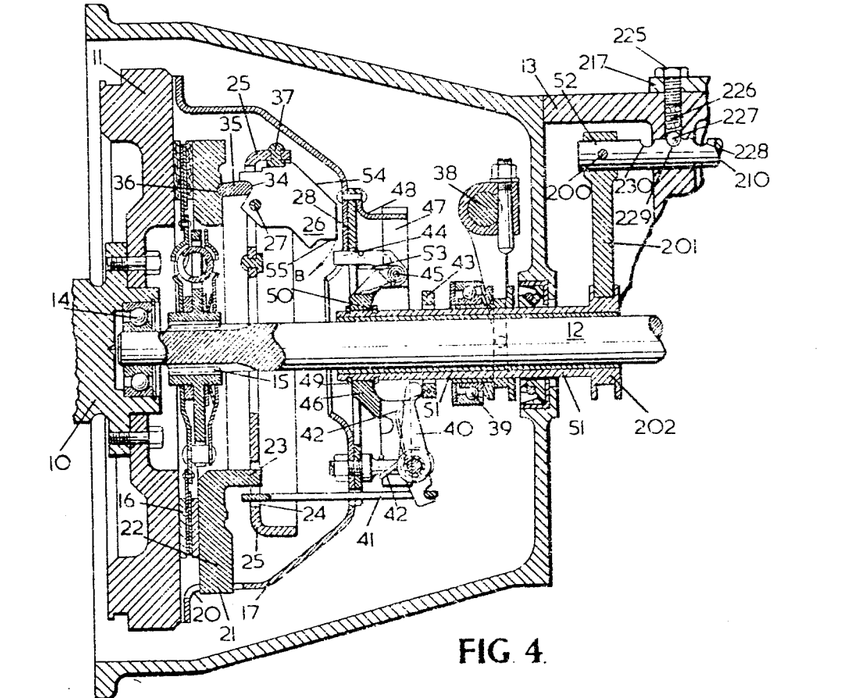
FIGURE 4 is a section corresponding with FIGURE 1 but showing the clutch in the engaged position and not prevented from re-engagement.

As will be seen from FIGURES 1 and 4 the crankshaft 10 of the vehicle engine is connected, in a conventional manner, to drive flywheel 11. The input shaft 12 of the gear-box 13 is journalled at 14 in the crankshaft 10 and has a splined connection 15 to the clutch plate 16.

Figure 2:
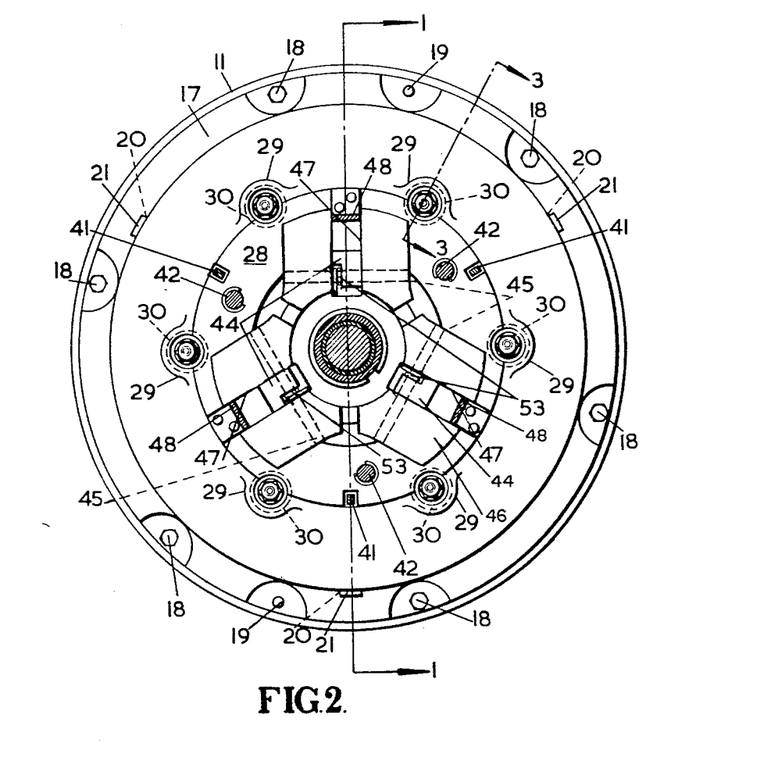
FIGURE 2 is a section as if taken on the line 2—2 of FIGURE 1.

Clutch cover 17 is made rotatively fast with the flywheel 11, see FIGURE 2, by bolts 18 and locating studs 19 and is provided with three circumferentially-spaced axially-extending slots 20 for engaging radially-extending pins 21 of pressure plate 22, so that the latter will be driven with the flywheel 11 and may be moved axially to urge the clutch plate 16 into engagement with the flywheel in order to provide a drive between the crankshaft 10 and the input shaft 12 of the gear-box.

The pressure plate 22 has three circumferentially-spaced axially-extending lugs 23 (only one of which is shown in FIGURES 1 and 4) which drivingly engage corresponding slots 24 in reaction plate 25. Accordingly it will be observed that the pressure plate 22 and the reaction plate 25 rotate together with the flywheel 11 and the clutch cover 17. Three centrifugal weights 26 (only one of which is shown in FIGURES 1 and 4) are journalled on corresponding chordwise pivots 27 which are carried by the reaction plate 25.

As will be best seen from FIGURES 1, 2 and 4 the end of the clutch cover 17, remote from the flywheel 11, is riveted to a stiffening ring 28. Recesses 29 for locating springs 30 are formed adjacent the ring 28 as will be seen in FIGURES 2, 3 and 5.

Figure 3:
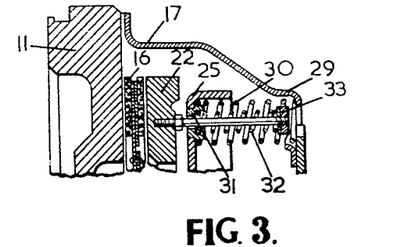
FIGURE 3 is a section taken on the line 3—3 of FIGURE 2.

The clutch is shown in a non-operative condition in FIGURES 1, 2 and 3, springs 30 bearing in the recesses 29 to hold the reaction plate 25 in the position shown. The pressure plate 22 carries studs 31 which extend through the reaction plate so as to lie co-axially within the springs 30 and further springs 32 are arranged to bear between the reaction plate 25 and adjusting nuts 33 on the end of studs 31 so as to hold the pressure plate in the diengaged position shown.

The centrifugal weights 26 each have a notch 34 for engaging a respective sprag 35 located by a corresponding notch 36 in the pressure plate 22.

The non-operative position of the reaction plate 25 determines the position of pins 27 of the centrifugal weights 26 and the non-operative position of the pressure plate 22 is adjusted by manipulating nuts 33 so that the centrifugal weights 26 are held in the position shown in FIGURE 1 when the clutch is disengaged by the engine speed falling below a fixed value.

Figure 5:
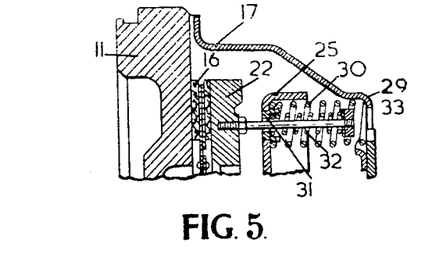
FIGURE 5 is a section corresponding with FIGURE 3 but showing the clutch condition of FIGURE 4.

When the speed of the said engine is increased above the fixed value the weights 26 tend to move in the direction of arrow "A." As the weights 26 swing radially outwards notches 34 urge sprags 35 against the pressure plate and cause the latter to move the clutch disc 16 into engagement with the flywheel 11. This movement compresses springs 32 against the reaction plate 25 but, as an equal and opposite reaction is applied at each pin 27, the reaction plate remains at first in the position shown in FIGURES 1 and 3 although the clutch has just started to transmit torque. Further increase of engine speed causes the weights 26 to continue their radially outward movement until they assume the attitude shown in FIGURE 4. During this continued movement the sprags 35 react directly through the pressure plate 22 on to the clutch disc 16 and the flywheel 11, and the reaction of the weights 26 against their respective pins 27 increases and causes the reaction plate 25 to move in the direction away from the pressure plate 22 until the springs 30 and 32 are sufficiently loaded to prevent further movement of the reaction plate; this condition is shown in FIGURE 5. The maximum force that may be applied by the centrifugal weights 26 is limited by stops 37 which prevent the weights from loading the springs 30 and 32 to a higher value.

The clutch is provided with a manual disengagement and re-engagement mechanism (e.g., operated from a conventional foot pedal) comprising a conventional crossshaft 38 for acting against thrust bearing 39 and operating clutch release levers 40 which are connected by straps 41 to the reaction plate 25. Hair springs 42 bias the levers 40 and an associated bearing washer 43 so that the straps 41 are kept taut irrespective of movement of the reaction plate due to the centrifugal mechanism.

As will be seen from FIGURE 4, when the cross-shaft 38 is actuated, the thrust bearing 39 will move until it engages the bearing washer 43 and operates the levers 40 to move the reaction plate 25 away from the pressure plate 22 so that the notches 34 of the centrifugal weights 26 no longer bear against the sprags and the clutch plate 16 is freed.

With the clutch as described so far, it is possible for an inexperienced driver to forget to disengage a high gear-ratio in which he had been travelling when he stops the vehicle at, for instance, traffic lights. When the driver then attempts to move off by increasing the engine speed so that the centrifugal clutch engages, the clutch will be overloaded and, in addition, the engine will probably stall.

These disadvantages are overcome by three pawl members 44 which are journalled on corresponding chordwise pivots 45 carried by a spider 46, see FIGURES 1, 2 and 4.

The spider is formed with three radially directed slots 47 which are engaged by fingers 48 held by rivets to the clutch cover 17 so that the spider rotates with the flywheel 11 and the pawl members 44 are always in line with their respective centrifugal weights 26. Two snap rings 49, 50 hold the spider axially fast with a sleeve 51 but at the same time allow relative rotation between the spider and the sleeve.

A control rod 52 from the gear-box 13 is connected by a pin 200 to a fork 201 which engages an annularly grooved boss 202 integral with the sleeve 51 so that axial movement of rod 52 will cause the sleeve to slide axially along the input shaft 12 to move the spider 46 and its associated pawl members 44 correspondingly. The manner in which the rod 52 is to be moved axially will be described later with reference to FIGURE 6.

A hair spring 53 biases each pawl member 44 to a position in which it abuts the inner periphery of stiffening ring 28.

It will be observed that when the spider is in the position shown in FIGURE 1 surface 54 of each weight 26 will bias the corresponding pawl member 44 against the ring 28 and prevent the weight from moving radially outwards to re-engage the clutch after the clutch has become disengaged due to a fall in engine speed. This position of the spider and associated pawl members is hereinafter described as a "baulking" position.

When the spider 46 is in the position shown in FIGURE 4 the centifugal weights 26 may swing freely about their respective pivots 27 as indicated by arrow "B" to allow the clutch to engage and disengage without hindrance from the pawls 44. This position of the spider and associated pawls is hereinafter described as a "non-baulking" position.

Consider the clutch to be in the engaged position as shown in FIGURE 4 and the pawls 44 to be moved from the non-baulking position to the baulking position. A subsequent fall in engine speed will then cause surfaces 55 of each weight 26 to move their respective pawls 44 against their hair springs 53 until each weight reaches its innermost position when the pawls will be moved back to the baulking positions by their hair springs to prevent the clutch from re-engaging. That is the condition shown in FIGURE 1.

The mechanism for moving the control rod 52 responsively to the gear-ratio engaged in the change-speed gearbox 13 is not considered to be part of this invention. However, so that the operation of the invention may be clearly understood, one mechanism for moving the control rod 52 is illustrated by way of example only with reference to FIGURE 6. In this drawing the gear-box 13 is shown to be of the layshaft type and provides three forward and one reverse ratio. The power input shaft 12 is formed integral with a gear 203 and constitutes the conventional first motion shaft. The gear 203 drives an unshown layshaft gear cluster having gears meshing the gears 204 and 205 which are coaxially mounted on the power output shaft 206. Two gear selector forks 207 and 208 are provided for operating respective pairs of synchromesh clutch units. The selector fork 207 is arranged to operate one of its synchromesh units to select the third or highest ratio by clutching the power input shaft 12 to the power output shaft 206 when moved leftwards to the position shown in FIGURE 3, and on movement to the right the fork 207 passes first through a neutral position in which both its synchromesh units are disengaged, and subsequently to a position in which its other said synchromesh unit clutches the gear 204 to the power output shaft 206 thereby providing the second or intermediate ratio. The selector fork 208 is shown in its neutral position but movement to the left from the neutral position operates one of its synchromesh units to clutch the gear 205 to the power output shaft 206 to provide the first or lowest forward ratio, and movement to the right from the neutral position operates its other said synchromesh unit to engage a reverse gear train between the layshaft and the power output shaft 206.

Figure 6:
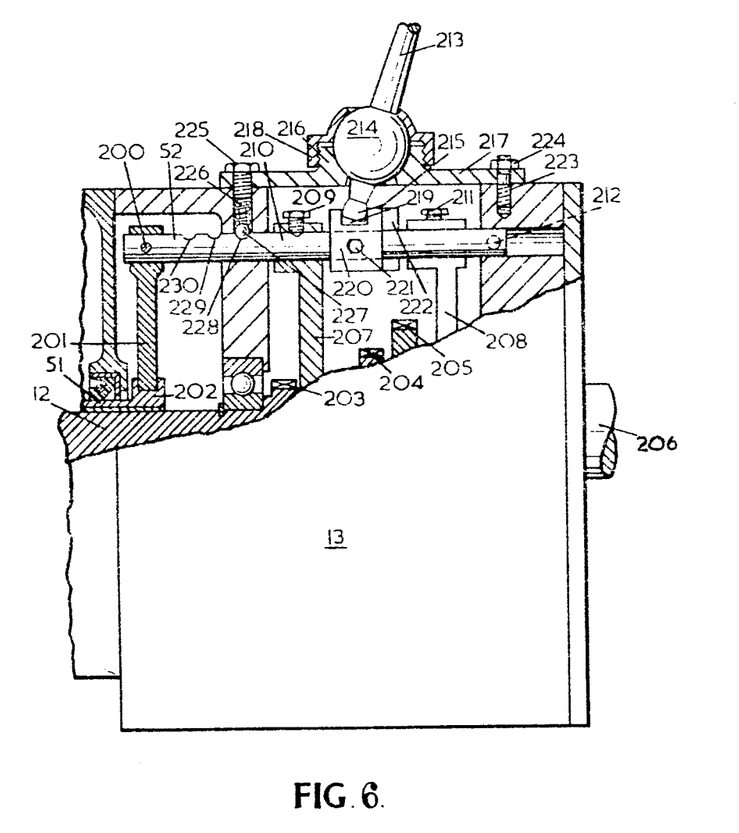
FIGURE 6 shows a change-speed gear-box secured to the right-hand end of FIGURE 1, part of the gear-box being broken away to show the change-speed controls.

The selector fork 207 is locked by a screw 209 to a selector slide 210 which is supported for axial sliding by the casing of the gear-box 13 as shown. A further selector slide is parallely spaced behind the slide 210 and is locked to the selector fork 208 by a screw 211. An interlock ball 212 arranged in a transverse horizontal passage in the casing of the gear-box 13 engages the two selector slides in a well-known manner to prevent both of the forks from being moved from their neutral positions at the same instant. A gear shift lever 213 is formed integral with a ball 214 and a gear shift tooth 215, and is supported for universal movement by the engagement of the ball 214 with a part spherical cup 216 formed integral with a cover 217 for the gear-box 13 and a part spherical cap 218 having a threaded engagement with the exterior of the cup 216. The gear shift tooth 215 is a sliding fit in a slot 219 formed in a shift block 220 held axially fast with the selector slide 210 by a screw 221 whereby movement of the gear shift lever 213 longitudinally backwards to the position shown will cause the selector fork 207 to engage the highest ratio, and movement longitudinally forwards will cause the selector fork 207 to pass through its neutral position to engage the intermediate ratio. A second shift block 222 having a slot of the same proportions as the slot 219 is held axially fast with the selector slide for the selector fork 208 such that the slots of the two shift blocks 220 and 222 are transversely aligned whenever both selector forks 207 and 208 are in the neutral position—whilst in this condition the gear shift lever 213 can be rocked transversely to transfer the gear shift tooth 215 from the slot 219 in the shift block 220 to the corresponding slot in the shift block 222. Thereafter, movement of the gear shift lever 213 longitudinally backwards will cause the selector fork 208 to engage the lowest forward ratio, and movement longitudinally forwards will cause the selector fork 208 to pass through its neutral position to engage the reverse drive ratio. The cover 217 is secured to the casing of the gear-box 13 by a series of studs 223 and nuts 224, and two bolts 225 arranged one behind the other serve the dual function of securing the cover 217 to the casing of the gear-box and loading respective springs 226 against respective retainer balls 227 for controlling the movement of the two selector slides. Due to the positioning of the selector slides and the bolts 225 only the spring 226 and retainer ball 227 for the slide 210 are seen. As shown in FIGURE 6 the retainer ball 227 engages a recess 228 in the selector slide 210 and two further recesses 229 and 230 are also formed in the selector slide 210. When the retainer ball 227 is engaged with the recess 228 the selector slide 210 is in the position corresponding with the selection of the highest gear ratio, and when the retainer ball 227 is engaged with the recess 229, as shown in FIGURE 4, the selector slide is in the position corresponding with the neutral position of the selector fork 207. As will be appreciated, the retainer ball 227 will engage the recess 230 when the selector slide 210 is moved to the position corresponding with the intermediate ratio. The co-operation of the other retainer ball with the unshown selector slide is exactly the same as described so far with the exception that the recess 230 would correspond with the selection of the lowest forward ratio by the selector fork 208, and the recess 228 would correspond with the selection of the reverse drive ratio.

The control rod is formed integral with the selector slide 210 such that the pawl members 44 will be in a baulking position to prevent the clutch 16 from engaging centrifugally when the highest gear ratio of the gear-box 13 is engaged. As soon as the selector slide 210 is moved to its neutral position or beyond to the position for selecting the intermediate ratio, the pawl member 44 will be moved to the non-baulking position shown in FIGURE 4. As the selector slide 210 will be in its neutral position whenever the lowest forward ratio or the reverse drive ratio of the gear-box 13 are engaged, it will be understood that the pawl member 44 will only be in the baulking position shown in FIGURE 1 when the highest ratio is engaged.

As has already been stated the mechanism for moving the control rod 52 responsively to the gear ratios engaged in the gear-box 13 does not form part of this invention and other types or arrangements to that shown may be used if so desired. The only criterion that must be fulfilled is that the control rod 52 should be arranged to be actuated by the selectors of the gear-ratios in the change-speed gear-box 13 in such a manner that the pawl members 44 will be in a baulking position and will thus prevent the clutch from engaging centrifugally when predetermined, undesirably high ratios are engaged.

The ratios in which the pawl members are in their baulking positions and the ratios in which they are in their non-baulking positions are a matter for selection to one skilled in the art of change-speed gear-boxes. For instance if the change-speed gear-box has three forward gears and one reverse gear the pawls could be arranged to be in their baulking positions when either the highest or the intermediate gear is engaged, or if the change-speed gear-box has four forward gears and one reverse gear the pawls could be arranged to be in their baulking positions when either the highest gear or the highest of the intermediate gears is engaged.

It is to be noted that the clutch can only be disengaged manually by actuating cross-shaft 38 after the centrifugal portion of the clutch is in the engaged position as shown in FIGURE 4, and that manual disengagement does not alter the positions of the weights 26. Accordingly it will be appreciated that the pawls 44, when in the baulking position, will not affect the manual disengagement, or personal re-engagement but will only affect the centrifugal re-engagement.

Figure 7:
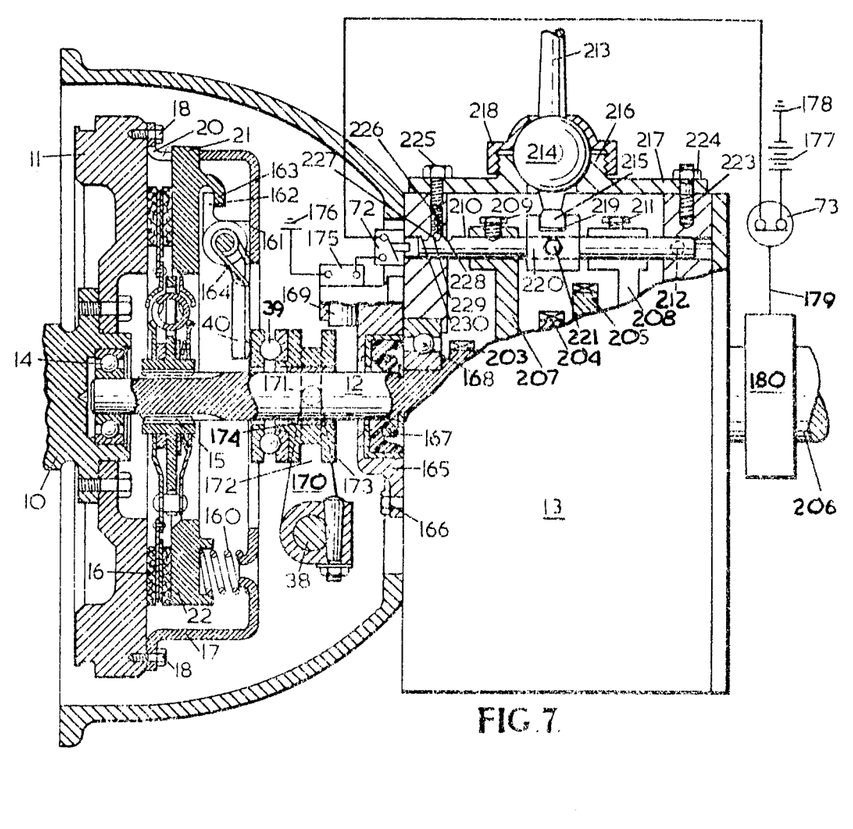
FIGURE 7 illustrates an embodiment of the said second aspect of the invention.

In FIGURE 7 the crankshaft 10 of the vehicle engine is connected in a conventional manner, to drive a flywheel 11. The input shaft 12 of a gear-box 13 is journalled at 14 in the crankshaft and has a splined connection 15 to a clutch friction plate 16. A clutch cover 17 is made rotatively fast with the flywheel 11 by a series of bolts 18 and is provided with three circumferentially-spaced axially-extending slots 20 for engaging radially-extending bosses 21 of a pressure plate 22 so that the latter will be driven with the flywheel and may be moved axially to urge the clutch plate 16 into engagement with the flywheel in order to provide a drive between the crankshaft 10 and the input shaft 12 of the gear-box. A series of compression coil springs 160 react between the clutch cover 17 and the pressure plate 22 so that the clutch is normally engaged.

The clutch is provided with a personal disengagement and re-engagement mechanism (e.g., operated from a conventional foot pedal) comprising a conventional cross-shaft 38 connected to drive a fork 170 having diametrically-opposed pins 171 coacting with the annular groove 172 of a thrust ring 173 which is slidingly supported from the shaft 12 by a bush 174 for acting against thrust bearing 39 to operate clutch release levers 40. The latter are connected by pillars 161 to the clutch cover 17 so that their outer ends 162 engage respective fingers 163 formed integral with the pressure plate 22. A light spring 164 biases each clutch release lever 40 to a position in which its outer end 162 engages the respective finger 163 in order to take up any free play.

A plate 165 is secured to the front wall of the gear-box 13 by a series of bolts 166 and serves the dual function of supporting an oil seal 167 and trapping the outer race of a bearing 168 supporting the power input shaft 12 from casing 13. A plunger 169 is supported by the plate 165 for radial sliding relatively to the shaft 12 and is biased radially outwardly by an unshown spring so that it does not foul the thrust ring 173. A solenoid 175 is carried by the plate 165 and when energised is arranged to move the plunger 169 radially inwards towards the shaft 12. One terminal of the solenoid 175 is connected to earth at 176 and its other terminal is connected through series connected switches 72 and 73 to one terminal of a battery 177 of which the other terminal is connected to earth at 178. Switch 72 is normally-open and is closed by the selector slide 210 of the gear-box 13 whenever the gear shift lever 213 is in the position corresponding with the selection of the highest gear ratio of the gear-box 13. The gear-box 13 has exactly the same arrangement of components as described with reference to FIGURE 6 and for this reason, the same reference numerals have been used in FIGURE 7 to identify equivalent components. In view of the high degree of similarity it is unnecessary to describe the action of the gear-box 13 shown in FIGURE 7 in any detail and the only point that should be noted is that the selector slide 210 is used to operate the switch 72. If it is desired to make the plunger 169 prevent the engagement of the clutch 16 when an attempt is made to drive the vehicle from rest with the intermediate ratio engaged, all that is necessary is another switch in parallel with switch 72 arranged to be operated by the other end of the selector slide 210. The only remaining difference from the gear-box shown in FIGURE 6 is that the selector slide 210 is shown in the neutral condition in which the retainer ball 227 engages the recess 229. On the other hand the switch 73 is normally-closed and is connected by an operating means 179 of conventional form to a governor 180 driven by the power output shaft 206 of the gear-box 13 so that the contacts of switch 73 will be opened when the road speed of the vehicle exceeds a predetermined speed at which the engagement of the top gear ratio is appropriate.

In this manner the plunger 169 will remain inoperative whenever the road speed of the vehicle exceeds the said predetermined speed so that the highest gear ratio of gear-box 13 can be engaged without hindrance. However, when the road speed of the vehicle falls below the said predetermined value and the cross-shaft 38 is operated to disengage the drive between the engine crankshaft 10 and the power input shaft 12, the subsequent engagement of the highest gear ratio will cause the switch 72 to close thus energising the solenoid and causing the plunger 169 to be urged into the space between the thrust ring 173 and the plate 165 thereby preventing re-engagement of the drive until the highest gear ratio has been disengaged or the road speed of the vehicle has risen to the said predetermined speed.

Figure 8:
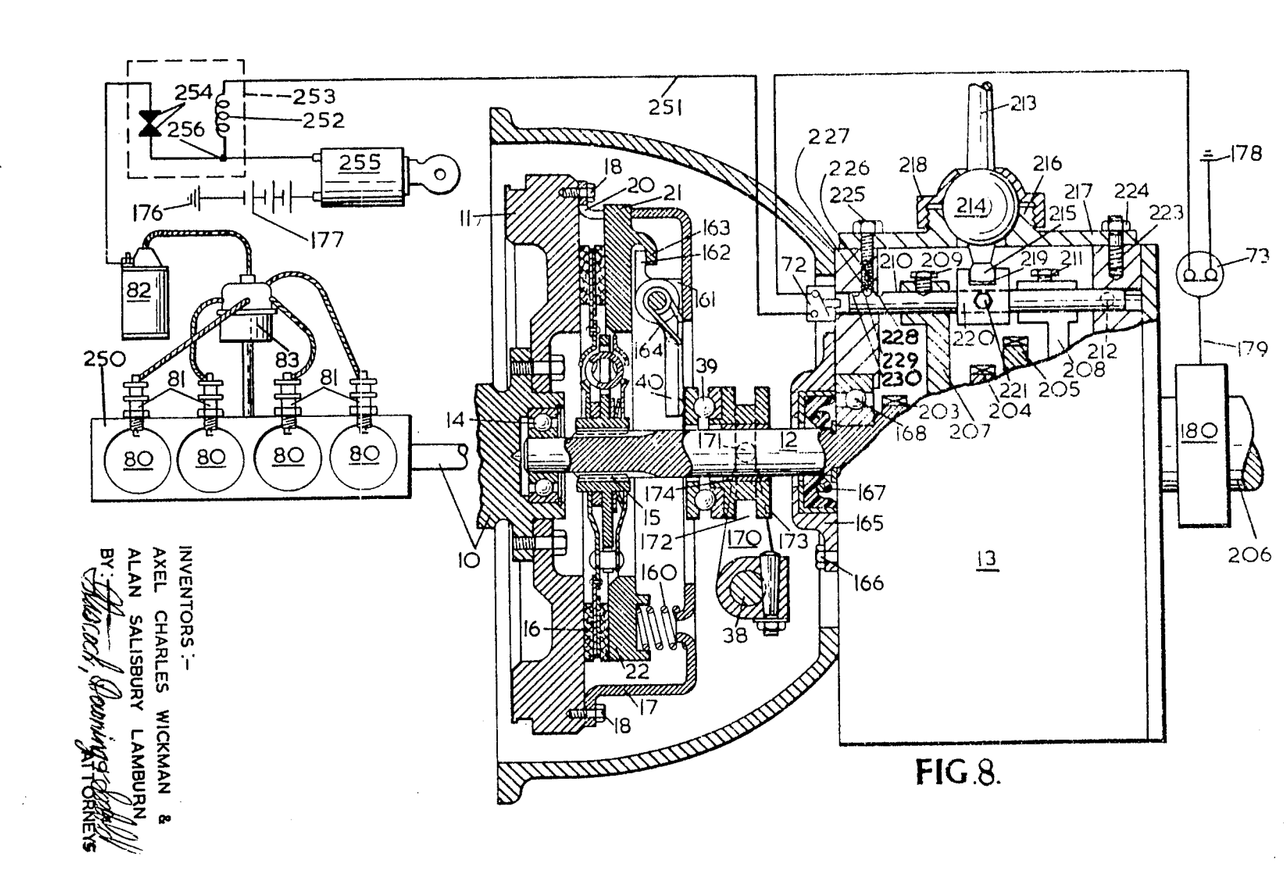
FIGURE 8 illustrates an embodiment of the said first aspect of the invention.

The construction illustrated by FIGURE 8 incorporates a large amount of the construction just described with reference to FIGURE 7. Accordingly the same reference numerals have been used and only the differences will be described. The only components omitted from the construction shown in FIGURE 7 are the plunger 169 and the solenoid 175. However, several additions have been made, the largest of which is the diagrammatic representation of the engine to a smaller scale at 250. The engine is provided with four cylinder bores 80 provided with respective spark plugs 81 fed from a coil 82 by a distributor 83. Switches 72 and 73 are connected by a wire 251 to be in series with the winding 252 of a relay 253 which is arranged, when energised, to open a pair of contacts 254.

The contacts 254 are arranged in series with the ignition switch 255 and the coil 82 so that, when the switch 255 is turned on, current from the battery 177 will energise the coil 82 provided the contacts 254 are closed. The ignition switch 255 also controls the supply of current to the relay winding 252 through the connection 256, but the relay winding cannot be energised until switches 72 and 73 have been closed to complete the circuit. As before, the switch 72 is arranged to be closed by the selector slide 210 whenever the gear shift lever 213 is in the position corresponding with the selection of the highest gear ratio of gear-box 13, that is, the position in which the retainer ball 227 engages the recess 228. Also as before, the switch 73 is normally closed and is connected by an operating means 179 of conventional form to the governor 180 which is driven by the power output shaft 206 so that the contacts of switch 73 will be opened when the road speed of the vehicle exceeds a predetermined speed at which the engagement of the highest gear ratio is appropriate. Thus an attempt to drive the vehicle forward from rest with the highest gear ratio of gear-box 13 engaged will cause both switches 72 and 73 to be closed and will result in the ignition circuit being broken so that it will not be possible to re-start the engine until the intermediate, lowest or reverse gear ratio has been selected.

Figure 10:
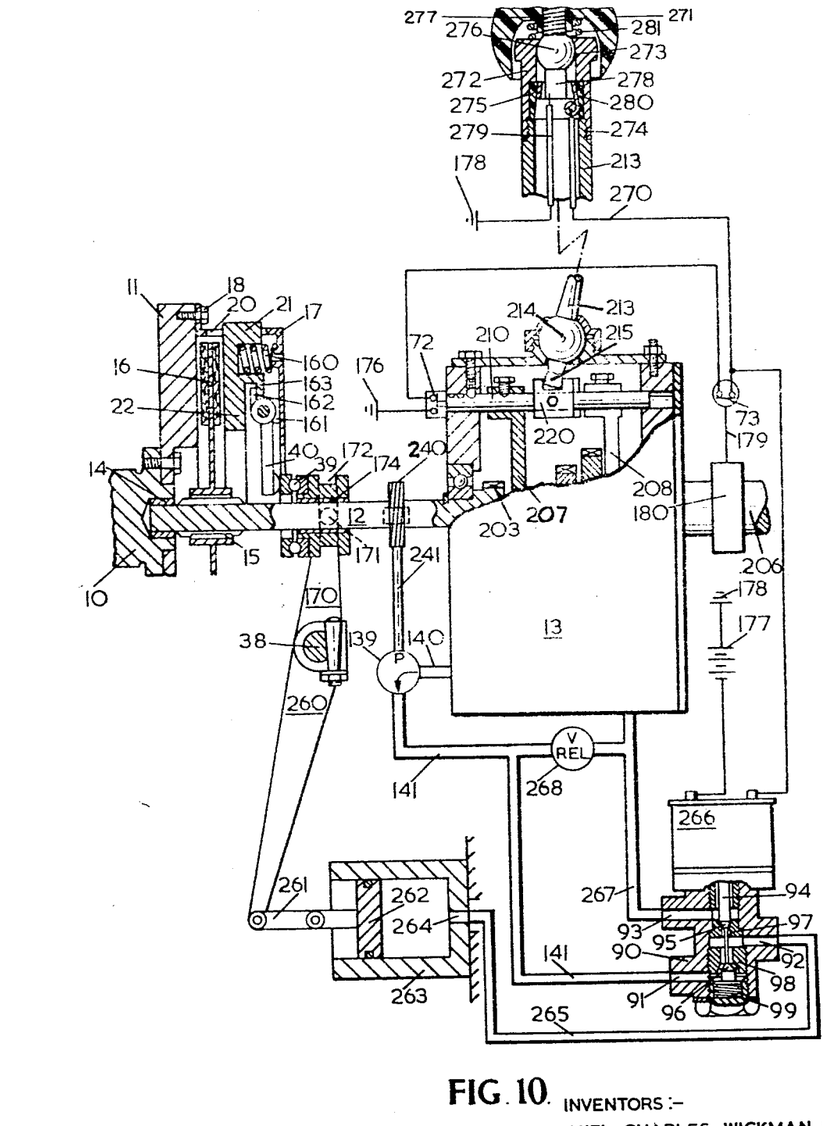
FIGURE 10 illustrates an alternative embodiment of the said third aspect of the invention.

FIGURE 10 shows the application of the invention for inhibiting the action of a friction clutch 16 which is engaged by the action of compression springs 160. The construction of the clutch 16 and the gear-box 13 and their operation are exactly the same as described with reference to FIGURE 7 and accordingly the same reference numerals have been used to identify equivalent components. Apart from the simplified showing of the clutch 16 the only modifications are the omission of the plunger 169 and the solenoid 175, and the addition of a pump 139 driven from the shaft 12 by skew gears 240 and drive shaft 241. The cross-shaft 38 is driven by a lever 260 and a pivoted link 261 from a piston 262 working in the bore of a cylinder 263 such that application of fluid pressure through port 264 from pipe 265 will cause the pressure plate 22 to be withdrawn from the clutch plate 16 against the springs 160. As before the switches 72 and 73 are arranged in series with a battery 177 and a solenoid 266 which, when energised, is arranged to operate a valve of which the body is shown generally at 90. The valve body has an inlet port 91 connected by pipe 141 to be supplied with hydraulic fluid under pressure by the pump 139, a delivery port 92 connected by pipe 265 to the cylinder 263 for disengaging the clutch 16, and an exhaust port 93 that is connected by a pipe 267 to the sump of the gear-box 13. A relief valve 268 is arranged operatively between the pipes 141 and 267 for regulating the pressure developed by the pump 139.

Within the valve body 90 is a valve stem 94 which is fast with the armature of the solenoid 266 and is formed with opposed frusto-conical valve faces 95 and 96 for respective coaction with valve seats 97 and 98. In the position shown, in which the solenoid has been energised by the gear shift lever 213 having been left in the position corresponding with the engagement of the highest gear ratio whilst the vehicle has come to rest, the solenoid 266 has urged the valve stem 94 downwardly against a return spring 99 to close valve 95, 97 so as to cut off the exhaust of fluid from cylinder 263 through pipes 265 and 267, and to open valve 96, 98 so as to connect the pressure fluid in pipe 141 to the cylinder 263 to disengage the clutch 16 as shown.

In these conditions the clutch 16 cannot be engaged until the gear shift lever 213 has been moved to select the intermediate, the lowest or the reverse gear ratio, as a result of which switch 72 will open as hereinbefore described and will de-energise the solenoid 266 so that spring 99 will open valve 95, 97, and will close the valve 96, 98 thereby disconnecting the cylinder 263 from the supply pipe 141 and allowing the fluid in the cylinder 263 to exhaust through pipes 265 and 267 so that the clutch 16 will be engaged by the action of the springs 160.

After the vehicle has moved from rest, the switch 73 will be opened by the governor 180 as hereinbefore described so that when switch 72 is afterwards closed by the proper selection of the highest gear ratio, the solenoid 266 will remain de-energised and will permit the clutch to be operated normally as will be described later on.

While reference has been made to the clutch being operated to the disengaged condition by hydraulic fluid under pressure, it will be readily appreciated that the apparatus described with reference to FIGURE 10 is readily adaptable for operation by pneumatic pressure, or by a vacuum. It will also be appreciated that in order to disengage the clutch while making a gear change during normal running, provision should be made for temporarily energising the solenoid. Such provision could be made in a variety of ways, but is preferably achieved by arranging an additional switch in a wire 270 leading from earth 178 to the solenoid 266. In this manner whenever the additional switch is closed the solenoid 266 will be energised so that the clutch 16 will be disengaged. This additional switch is preferably of the known kind sometimes called a "wobbly knob" switch, and is arranged inside the gear shift knob 271 at the top of the gear shift lever 213. So that the operation of this additional switch may be clearly understood, the knob 271 and the top of the gear shift lever 213 have been drawn to a much larger scale. An adaptor 272 having a part-spherical cup 273 is attached to the top of the gear shift lever 213 by threads 274 and an insulating tube 275 having a frusto-conical inner wall is trapped between the lever 213 and the adaptor 272. The gear shift knob is retained by a ball member 276 which coacts with the cup 273 and has a threaded extension 277 coacting with the gear shift knob 271. A contact pin 278 is formed integral with the ball member 276 and is connected by a wire 279 to earth 178. A frusto-conical contact member 280 is supported by the inner wall of the insulating tube 275 and is connected by wire 270 to the solenoid 266. A compression coil spring 281 reacts between the gear shift knob 271 and the top of of the adaptor 272 to bias the contact pin 278 into the position shown in which it does not make any contact with the contact member 280. However, when the gear shift lever 218 is moved in any direction by the driver applying a suitable force to the knob 271, the latter will pivot about the ball member 276 against the spring 281 until the contact pin 278 engages the contact member 280 thereby completing the circuit for energising the solenoid 266. Therefore, the initial effect of selecting a new gear ratio is to close the switch formed by contact pin 278 and contact member 280 so that the solenoid 266 will be temporarily energised for disengaging the clutch 16, the bias of spring 281 afterwards opening the switch 278, 280 as soon as the driver's hand is withdrawn from the gear shift knob 271.

Figure 9:
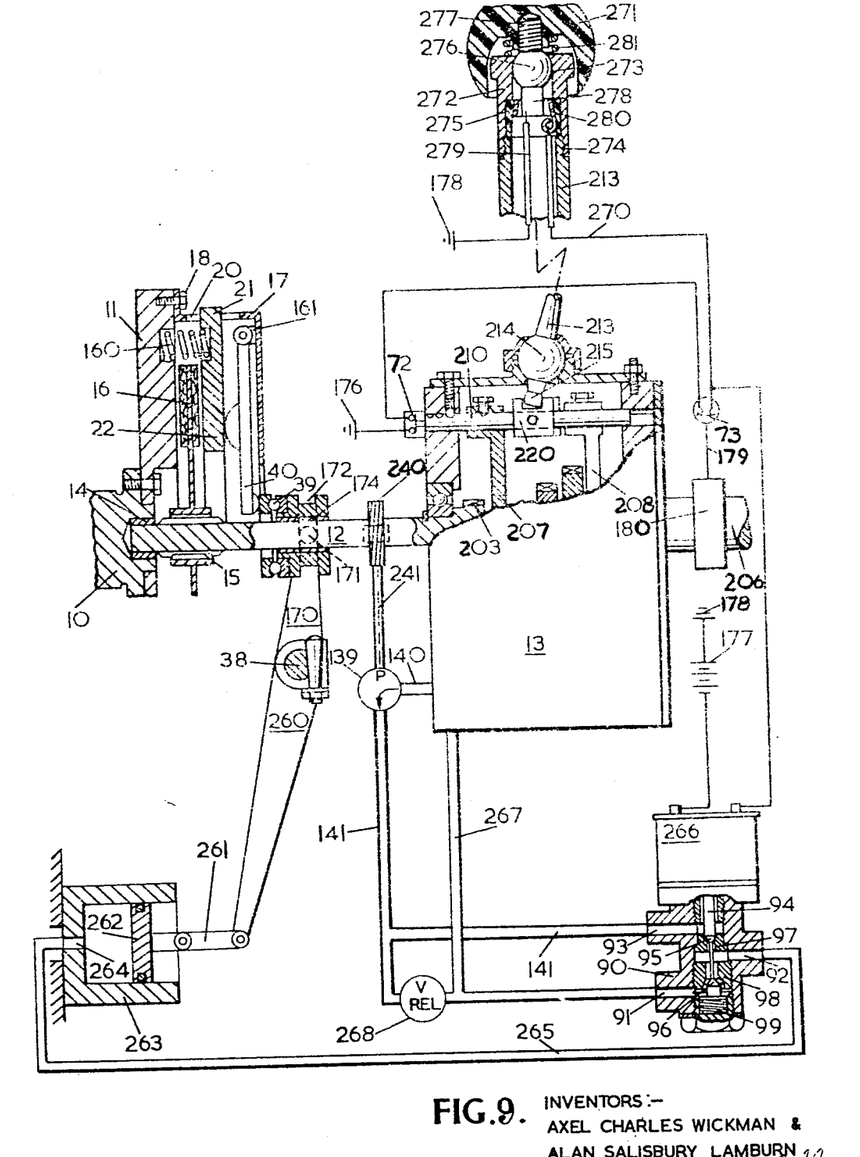
FIGURE 9 illustrates an embodiment of the said third aspect of the invention.

The principle taught by FIGURE 10 can also be applied in the case where the clutch is biased to the engaged condition by fluid pressure (i.e., by a positive hydraulic or pneumatic pressure, or by a vacuum), and is disengaged by a spring means. FIGURE 9 illustrates how this can be achieved and, as the majority of components shown in FIGURE 9 are the same as those just described with reference to FIGURE 10, the same reference numerals have been used and only the points of difference will be described. The clutch 16 is re-arranged so that the springs 160 bias the pressure plate 22 away from the flywheel 11 to disengage the clutch, and the pivot 161 for the lever 40 is moved radially outwards so that the action of the piston 262 is to move the lever 40 to urge the pressure plate 22 towards the flywheel 11 against the action of springs 160 to engage the clutch. To achieve this reversal, the cylinder 263 for the piston 262 has been moved to the other side of lever 260 so that the latter operates in the reverse direction. The only remaining alterations occur in the fluid circuit and comprise connecting the pipe 141 to supply port 93 instead of port 91, and connecting the pipe 267 to exhaust fluid from port 91 instead of port 93. As the entire electrical circuit operates in exactly the same manner as before, the alterations to the fluid circuit have the effect of reversing the operation of the valve arrangement within the body 90. Thus, whenever the solenoid 266 is energised to the position shown in FIGURE 9, the cylinder 263 exhausts through pipes 265 and 267 so that the springs 160 disengage the clutch, and whenever the solenoid 266 is de-energised the pipe 141 supplies fluid under pressure through pipe 265 to the cylinder 263 to engage the clutch 16 against the action of the springs 160.

Figure 11:
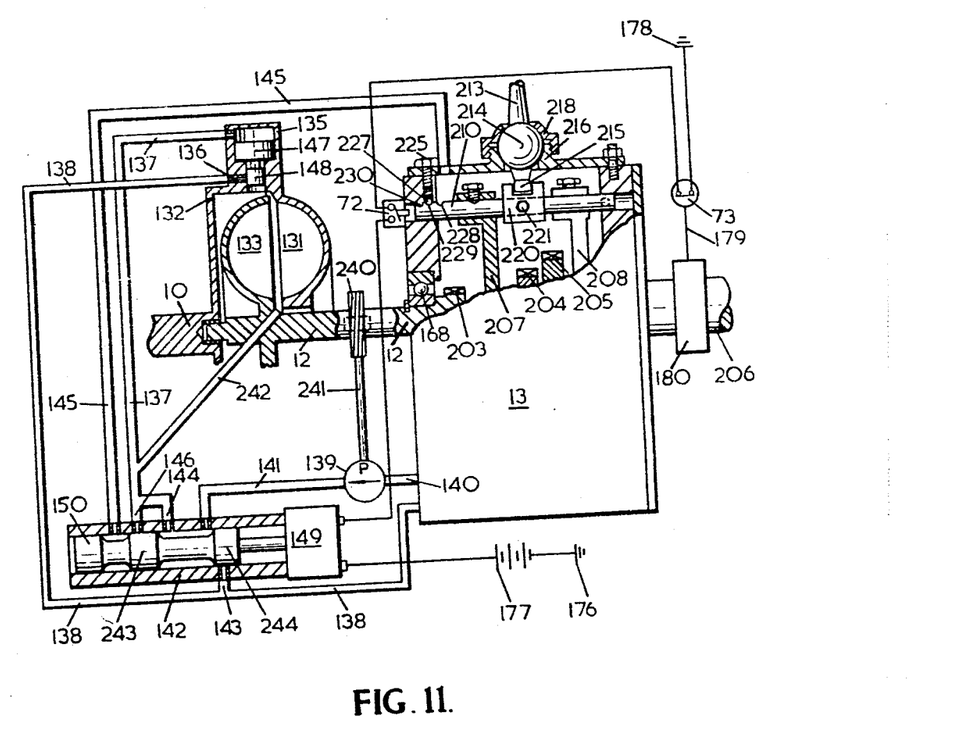
FIGURE 11 illustrates an embodiment of the said fifth aspect of the invention.

FIGURE 11 shows the application of the invention to a fluid coupling for the purpose of withdrawing the hydraulic fluid therefrom in accordance with the said fifth aspect of the invention. The drawing shows the engine-driven shaft 10 connected to drive the impeller 131 of the coupling and a fluid tight casing 132, and the torque receiving rotor 133 arranged within the casing 132 and connected to drive the power input shaft 12 for the gear-box 13. With a coupling of this type the fluid is usually trapped in the casing 132 and the rotor 133 is driven by the fluid acted upon by the impeller 131. However, with the arrangement shown in FIGURE 11, the casing 132 is modified by the provision of an exhaust valve 135 having a drain outlet 136 for the hydraulic fluid in the casing 132, and a control pressure line 137.

The drain outlet 136 communicates with the sump of the gear-box 13 through pipe 138. A pump 139 is driven from the power input shaft 12 to the gear-box by skew gears 240 and a shaft 241 and has the inlet end of its supply pipe 140 submersed in the hydraulic fluid in the sump of the gear-box 13. The pump outlet 141 supplies a valve body 142 with hydraulic fluid and a pipe 143 connects the said valve body to the gear-box sump through the pipe 138. The valve body 142 is connected to a pipe 144, for returning hydraulic fluid from pump outlet 141 to the coupling through a pipe 242, and is also connected to a vent pipe 145 which communicates with the top of the gear-box 13 to allow fluid exhausted from the coupling to be replaced by air through pipe 146. The valve 135 has spools 147, 148 of different diameters such that the force exerted on the large diameter spool 147, by hydraulic pressure delivered through the control pressure line 137, is greater than the combined hydraulic and centrifugal forces exerted on the small diameter spool 148 so that it is held in the position shown whenever the coupling is operative.

The gear-box 13 has exactly the same arrangement of components as are shown in FIGURE 7 and the switches 72 and 73 are operated in precisely the same manner. Accordingly the same reference numerals have been used and no further description of the gear-box 13 is required.

The switches 72 and 73 are in series with the winding of a solenoid 149, and the armature of the latter is fast with the spool 150 of valve body 142. When the vehicle is at rest switch 73 is closed as before and, if the gear shift lever 213 is in the position corresponding with the highest gear ratio, the switch 72 is closed by the selector slide 210. This energises solenoid 149 and operates spool 150 to the position in which pipe 143 is put in communication with pump outlet 141 thus destroying the pressure in the control pressure line 137. As the pressure of the fluid acting on spool 147 drops, the spools 147, 148 move upwards to open drain outlet 136 and so empty the fluid coupling through pipe 138. During this operation a land 243 of the spool 150 prevents the pump outlet 141 from delivering fluid through pipe 144 to the coupling, but allows the fluid leaving the coupling to be replaced by air from the top of the gear-box 13 through the vent pipe 145.

As soon as the selector slide 210 is moved to its neutral position in which the retainer ball 227 engages the recess 229, or to the position for engaging the intermediate ratio in which the retainer ball 227 engages the recess 230, the switch 72 is opened to de-energise the solenoid 149 whereupon the land 244 of the spool 150 interrupts the connection between pump outlet 141 and the pipe 143, and the land 243 interrupts the connection between the vent pipe 145 and pipe 146 and connects pump outlet 141 to pipe 144 as shown in FIGURE 11. The pressure acting on spool 147 causes the spool 148 to close the drain outlet 136 and the pump 139 fills the coupling with fluid through pipes 144 and 242. As before, switch 73 will open as soon as the vehicle starts to move, so that the closing of switch 72 during the making of a normal change into the highest gear ratio will leave the solenoid 149 unenergised.

What we claim as our invention and desire to secure by Letters Patent of the United States is:

1. A motor vehicle power transmission system comprising an engine-driven shaft, a change-speed gearing, a power input shaft to said change-speed gearing, a disengageable coupling means arranged to connect said engine-driven shaft to said power input shaft, a control for said change-speed gearing, said control being operable optionally to select any one of a plurality of different gear-ratios provided by said change-speed gearing, means operable to prevent the transmission of power to said input shaft, operating means interconnecting said control and said power transmission preventing means, said control being adapted to activate said power transmission preventing means through said operating means, said control being adapted to deactivate said power transmission preventing means whenever said control causes a low gear-ratio of said change-speed gearing to be engaged, means operable responsively to the road speed of the vehicle and adapted to deactivate said power transmission preventing means when the vehicle is moving, and said control and said road-speed-responsive means being adapted jointly to activate said power transmission preventing means when said control causes a high gear-ratio of said change-speed gearing to be engaged whilst the vehicle is at rest whereby an attempt to drive the vehicle forward from rest will be frustrated until said control is moved to select the said low gear-ratio.

2. The motor vehicle power transmission system as claimed in claim 1 and including an engine for driving said first-mentioned shaft, a spark ignition circuit for controlling the operation of said engine and thus, said shaft, the means operable for preventing transmission of power to said input shaft including components in said ignition circuit operable, when activated, to cause said engine to stop, the operating means interconnecting said control and said power transmission preventing means including a first electrical switch arranged in said circuit adapted to be closed when said control causes a high-gear ratio to be engaged and to be open when said control causes a low gear ratio to be engaged, a second electrical switch in said circuit, the means operable responsive to road speed being operably related with said second electrical switch to open same when the vehicle is moving above a predetermined speed and said first and second electrical switches being arranged when activated together to closed condition to cause said components to break said ignition circuit, whereby an attempt to drive the vehicle forward from rest with said high-gear ratio engaged will be frustrated until said control is moved to select said low-gear ratio.

3. The motor vehicle power transmission system, as claimed in claim 2 and further comprising an ignition switch arranged in said ignition circuit, said ignition switch also being adapted to break said ignition circuit, said components including a normally-closed relay-operated switch arranged in said ignition circuit in series with said ignition switch, a relay winding for said normally-closed relay-operated switch, said control being adapted to close said first electrical switch whenever said control causes a high gear-ratio of said change-speed gearing to be engaged, said road-speed-responsive means being adapted to close said second electrical switch whenever the vehicle is at rest, and said first and second electrical switches being arranged in series with said relay winding whereby said normally-closed relay-operated switch will be opened to break said ignition circuit whenever said control causes a high gear-ratio of said change-speed gearing to be engaged whilst the vehicle is at rest.

4. A motor vehicle power transmission system comprising an engine-driven shaft, a change-speed gearing, a power input shaft to said change-speed gearing, a friction clutch arranged to connect said engine-driven shaft to said power input shaft, a mechanical spring means adapted to bias said friction clutch to the engaged condition, a manually-operable lever adapted to disengage said friction clutch against the action of said bias, a control for said change-speed gearing, said control being operable optionally to select any one of a plurality of different gear-ratios provided by said change-speed gearing, means operable to prevent transmission of power to said power input shaft by preventing engagement of said friction clutch, operating means interconnecting said control and said clutch engagement preventing means, said control being adapted to activate said clutch engagement preventing means through said operating means, said control being adapted to deactivate said clutch engagement preventing means whenever said control causes a low gear-ratio of said change-speed gearing to be engaged, means operable responsively to the road speed of the vehicle and adapted to deactivate said clutch engagement preventing means when the vehicle is moving above a predetermined speed, and said control and said road-speed-responsive means adapted jointly to actuate said clutch engagement preventing means when said control causes a high gear-ratio of said change-speed gearing to be engaged whilst the vehicle is at rest whereby an attempt to drive the vehicle forward from rest will be frustrated until said control is moved to select the said low gear-ratio.

5. The motor vehicle power transmission system, as claimed in claim 4, in which said clutch engagement preventing means comprises a movable plunger operably related with said clutch and normally biased to a position to permit engagement of said clutch, said operating means including a solenoid operably related with said plunger and adapted when energised to move said plunger to a position in which said plunger prevents engagement of said friction clutch, said operating means including a first electrical switch, said control being adapted to close said first electrical switch whenever said control causes a high gear-ratio of said change-speed gearing to be engaged, a second electrical switch, said road-speed-responsive means being adapted to close said second electrical switch whenever the vehicle is below said predetermined speed, an electrical circuit for operating said solenoid, and said first and second electrical switches being arranged in series in said electrical circuit whereby said solenoid will be energised to move said plunger to said position preventing engagement of said clutch whenever said control causes a high gear-ratio of said change-speed gearing to be engaged whilst the vehicle is at rest.

6. A motor vehicle power transmission system comprising an engine-driven shaft, a change-speed gearing, a power input shaft to said change-speed gearing, a disengageable coupling means including a friction clutch arranged to connect said engine-driven shaft to said power input shaft, a fluid pressure operable means adapted to bias said friction clutch to the engaged condition, further means operable to cause said friction clutch to disengage, means adapted to supply fluid pressure to said fluid pressure operable means to cause said friction clutch to engage, means adapted to break the supply of fluid pressure to said fluid pressure operable means whereby said further means cause said friction clutch to disengage, a control for said change-speed gearing, said control being operable optionally to select any one of a plurality of different gear-ratios provided by said change-speed gearing, means operable to prevent transmission of power to said input shaft including relief valve means operable to relieve the pressure of the fluid in said fluid operable means thereby to prevent engagement of said friction clutch, operating means interconnecting said control and said relief valve means, said control being adapted to activate said relief valve means through said operating means, said control being adapted to deactivate said relief valve means whenever said control causes a low gear-ratio of said change-speed gearing to be engaged, means operable responsively to the road speed of the vehicle and adapted to deactivate said relief valve means when the vehicle is moving, and said control and said road-speed-responsive means being adapted jointly to activate said relief valve means when said control causes a high gear-ratio of said change-speed gearing to be engaged whilst the vehicle is at rest whereby an attempt to drive the vehicle forward from rest will be frustrated until said control is moved to select the said low gear-ratio.

7. The motor vehicle power transmission system, as claimed in claim 6, in which said means adapted to supply and to break the supply of fluid pressure to said fluid pressure operable means and said relief valve means comprises a valve body, said body having a delivery passage connecting said valve body to said fluid pressure operable means, an inlet passage to said valve body adapted to receive said supply of fluid under pressure, an exhaust passage from said valve body, valve mechanism within said valve body operable from a first position to a second position, said valve mechanism when in said first position establishing a communication between said inlet passage and said delivery passage and closing said exhaust passage, said valve mechanism when in said second position establishing a communication between said delivery passage and said exhaust passage and closing said inlet passage, a spring means biasing said valve mechanism to said first position, said operating means including a solenoid operable to move said valve mechanism against said spring means to said second position, a first electrical switch for said solenoid, said control being adapted to close said first electrical switch whenever said control causes a high gear-ratio of said change-speed gearing to be engaged, a second electrical switch, said road-speed-responsive means being adapted to close said second electrical switch whenever the vehicle is at rest, an electrical circuit for operating said solenoid, and said first and second electrical switches being arranged in series in said electrical circuit whereby said solenoid will be energized to close said delivery passage and establish a communication between said inlet passage and said exhaust passage whenever said control causes said high gear ratio to be engaged whilst the vehicle is at rest.

8. A motor vehicle power transmission system comprising an engine-driven shaft, a change-speed gearing, a power input shaft to said change-speed gearing, a disengageable coupling means including a friction clutch arranged to connect said engine-driven shaft to said power input shaft, a mechanical spring means arranged to bias said friction clutch to the engaged condition, a fluid pressure operable means adapted to urge said friction clutch against said mechanical spring means to the disengaged condition, means adapted to supply fluid pressure to said fluid pressure operable means to cause said friction clutch to disengage, means operable to relieve said supply of fluid pressure to said fluid pressure operable means to allow said spring means to cause said friction clutch to engage, a control for said change-speed gearing, said control being operable optionally to select any one of a plurality of different gear-ratios provided by said change-speed gearing, means operable to prevent transmission of power to said input shaft including relief preventing means operable to prevent said relief of said supply of fluid pressure to said fluid pressure operable means, operating means interconnecting said control and said relief preventing means, said control being adapted to activate said relief preventing means through said operating means, said control being adapted to deactivate said relief preventing means whenever said control causes a low gear-ratio of said change-speed gearing to be engaged so as to relieve said supply of said fluid pressure to said fluid pressure operable means, means operable responsively to the road speed of the vehicle and adapted to deactivate said relief preventing means when the vehicle is moving, and said control and said road-speed-responsive means being adapted jointly to actuate said relief preventing means when said control causes a high gear-ratio of said change-speed gearing to be engaged whilst the vehicle is at rest whereby an attempt to drive the vehicle forward from rest will be frustrated until said control is moved to select the said low gear-ratio.

9. The motor vehicle power transmission system, as claimed in claim 8, in which said means adapted to supply fluid pressure to said fluid operable means and the means operable to relieve said supply of fluid pressure to said fluid pressure operable means and said relief preventing means comprises a valve body, said body having a delivery passage connecting said valve body to said fluid pressure operable means, an inlet passage to said valve body adapted to receive said supply of fluid under pressure, an exhaust passage from said valve body, valve mechanism within said valve body operable from a first position to a second position, said valve mechanism when in said first position establishing a communication between said delivery passage and said exhaust passage and closing said inlet passage, said valve mechanism when in said second position establishing a communication between said inlet passage and said delivery passage and closing said exhaust passage, a spring means biasing said valve mechanism to said first position, said operating means including a solenoid operable to move said valve mechanism against said spring means to said second position, a first electrical switch for said solenoid, said control being adapted to close said first electrical switch whenever said control causes a high gear-ratio of said change-speed gearing to be engaged, a second electrical switch, said road-speed-responsive means being adapted to close said second electrical switch whenever the vehicle is at rest, an electrical circuit for operating said solenoid, and said first and second electrical switches being arranged in series in said electrical circuit whereby said solenoid will be energised to close said exhaust passage and establish a communication between said inlet passage and said delivery passage whenever said control causes said high gear-ratio to be engaged whilst the vehicle is at rest.

10. A motor vehicle power transmission system comprising an engine-driven shaft, a driving element adapted to be driven by said engine-driven shaft, a change-speed gearing, a power input shaft to said change-speed gearing, a driven element adapted to drive said power input shaft, a fluid-tight casing, said driving and driven elements being arranged within said casing, fluid contained within said casing to separate said driving and driven elements, said driving element being adapted to impart kinetic energy to said fluid, said driven element being adapted to extract kinetic energy from said fluid, means operable to withdraw said fluid from said casing, said fluid withdrawal means, said casing, said fluid and said driving and driven elements constituting a disengageable coupling means, said disengageable coupling means being arranged to transmit drive from said engine-driven shaft to said power input shaft when said fluid is contained by said casing, said fluid withdrawal means when operated causing disengagement of said coupling means, a control for said change-speed gearing, said control being operable optionally to select any one of a plurality of different gear-ratios provided by said change-speed gearing, means actuable to operate said fluid withdrawal means to prevent the transmission of power from said engine-driven shaft to said input shaft, operating means interconnecting said control and said last-mentioned means, said control being aadpted to activate said means for operating said fluid withdrawal means, said control being adapted to deactivate said means for operating said fluid withdrawal means whenever said control causes a low gear-ratio of said change-speed gearing to be engaged, means operable responsively to the road speed of the vehicle and adapted to deactivate said means for operating said fluid withdrawal means when the vehicle is moving, and said control and said road-speed-responsive means being adapted jointly to activate said means for operating said fluid withdrawal means when said control causes a high gear-ratio of said change-speed gearing to be engaged whilst the vehicle is at rest whereby an attempt to drive the vehicle forward from rest will be frustrated until said control is moved to select the said low gear-ratio.

11. The motor vehicle power transmission system, as claimed in claim 10, in which said operating means includes a solenoid, and electrical circuit for energising said solenoid, said solenoid when energised being arranged to operate said fluid withdrawal means, thereby to break the drive between said engine-driven shaft and said power input shaft, a first electrical switch, said control being adapted to close said first electrical switch whenever said control causes a high gear-ratio of said change-speed gearing to be engaged, a second electrical switch, said road-speed-responsive means being adapted to close said second electrical switch whenever the vehicle is at rest, and said first and second electrical switches being arranged in series in said electrical circuit whereby said solenoid will be energised to operate said fluid withdrawal means whenever said control causes the said high gear-ratio to be engaged whilst the vehicle is at rest.

References Cited by the Examiner
UNITED STATES PATENTS

| | | | |
|---|---|---|---|
| 2,800,208 | 7/1957 | Binder | 192—3.5 |
| 2,939,557 | 6/1960 | Dabich et al. | 192—3.5 |
| 2,957,558 | 10/1960 | Croucher | 192—3.5 |
| 3,094,202 | 6/1963 | Issler | 192—3.5 |

DAVID J. WILLIAMOWSKY, *Primary Examiner.*

DON A. WAITE, *Examiner.*

A. T. McKEON, *Assistant Examiner.*